June 26, 1956  O. S. KOSKINEN  2,751,978
EXPANDED METAL AND METHOD OF FORMING SAME
Filed July 29, 1953  3 Sheets-Sheet 1

INVENTOR.
Onni S. Koskinen
BY Thos. S. Connelly
Attorney

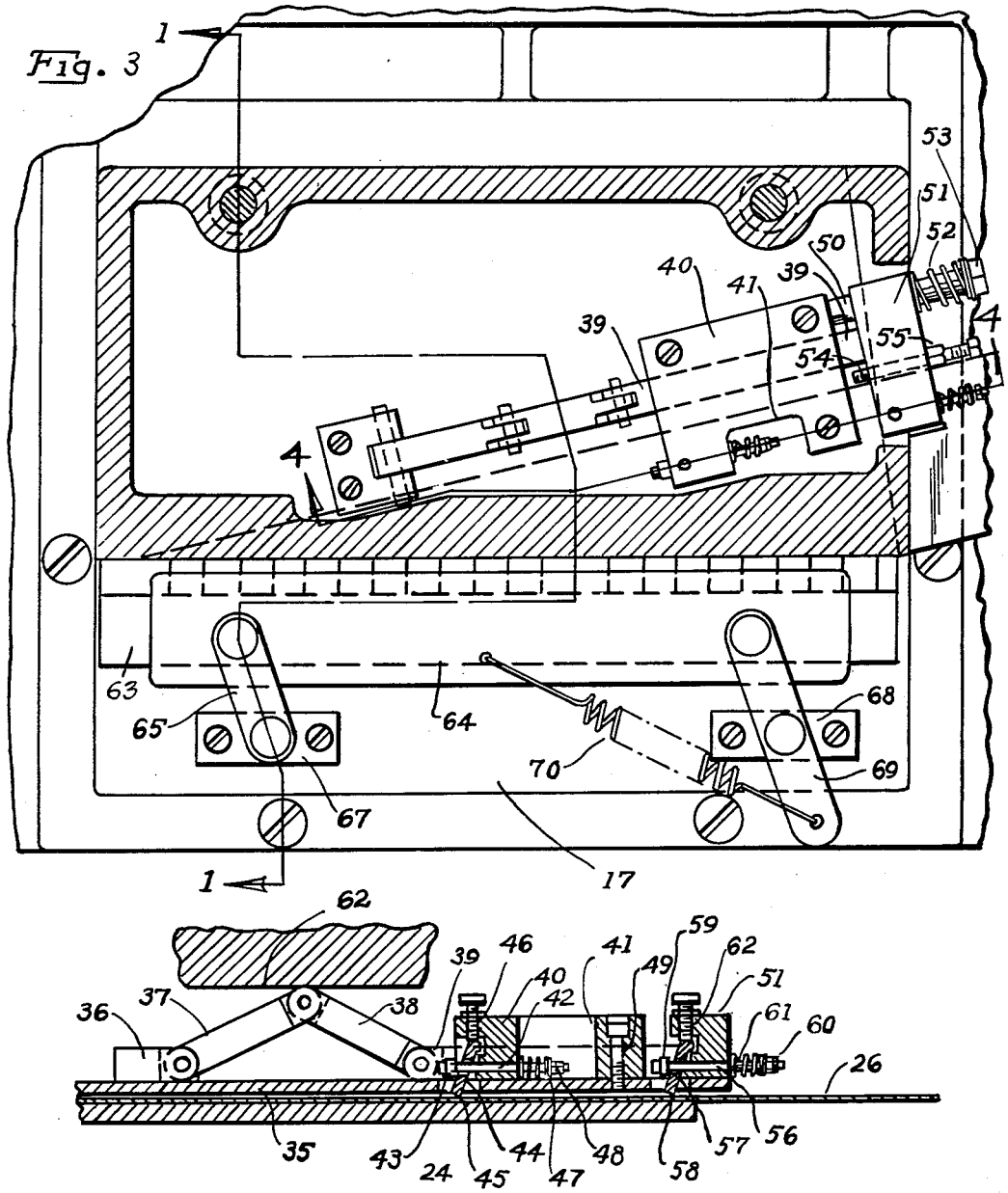

June 26, 1956  O. S. KOSKINEN  2,751,978
EXPANDED METAL AND METHOD OF FORMING SAME
Filed July 29, 1953  3 Sheets-Sheet 3
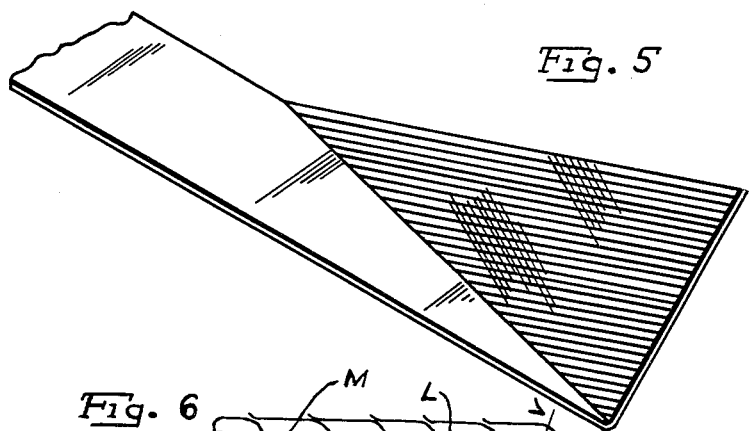
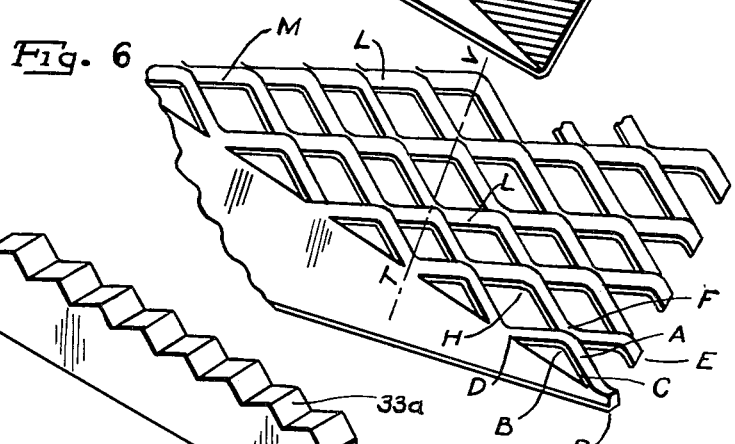
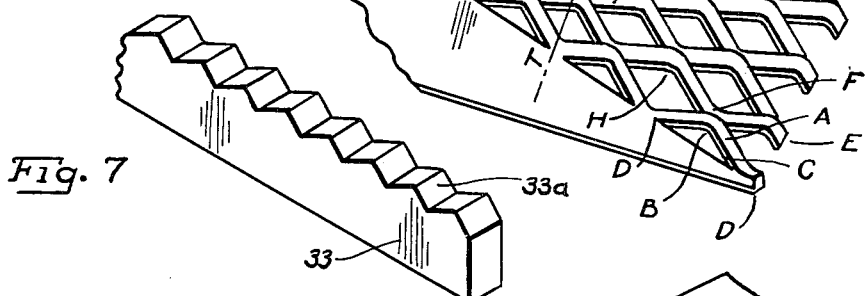
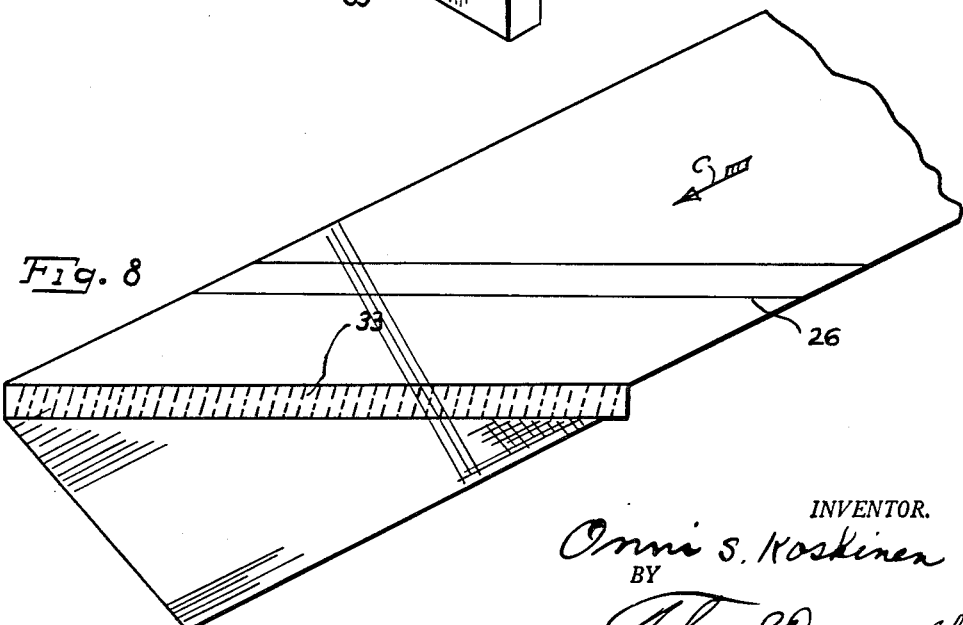
INVENTOR.
Onni S. Koskinen
BY
Thos. S. Donnelly
Attorney

United States Patent Office 2,751,978
Patented June 26, 1956

2,751,978

EXPANDED METAL AND METHOD OF FORMING SAME

Onni S. Koskinen, Birmingham, Mich.

Application July 29, 1953, Serial No. 370,939

6 Claims. (Cl. 164—6.5)

My invention relates to a new and useful improvement in expanded metal and the method of forming same.

It is an object of the present invention to provide expanded metal which is sheared and formed substantially in the grain direction so as to produce a stronger expanded metal.

Another object of the invention is the provision of a method of forming expanded metal in which the shearing and forming is done by a straight up and down motion thus dispensing with all endwise reciprocations of either the cutter or the work-piece.

Another object of the invention is the provision of expanded metal and method of forming same whereby the expanded metal may be formed more economically.

Another object of the invention is the provision of expanded metal and method of forming same whereby partial shearing of the bond between the strands is avoided.

Another object of the invention is the provision of expanded metal and method of forming same in which the sheet of metal is fed diagonally of the line of cut.

Another object of the invention is the provision of expanded metal and method of forming same whereby the band of the expanded metal may be varied, within certain limits, by varying the amount of feed.

Another object of the invention is the provision of expanded metal and method of forming same whereby the expanded metal may be formed from comparatively narrow and easily handled coil stock.

Other objects will appear hereinafter.

It is recognized that various modifications and changes may be made in the details of structure illustrated and it is intended that the present disclosure is but the preferred embodiment of the invention.

Figure 1:
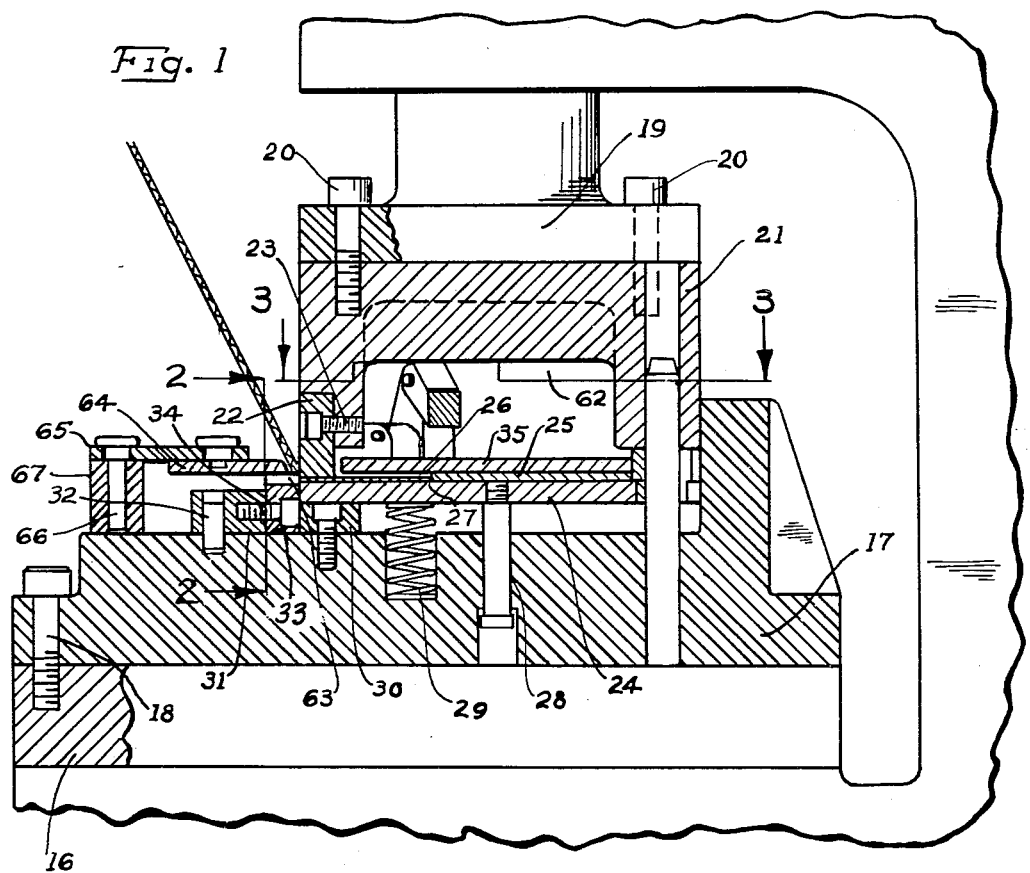
Figure 2:
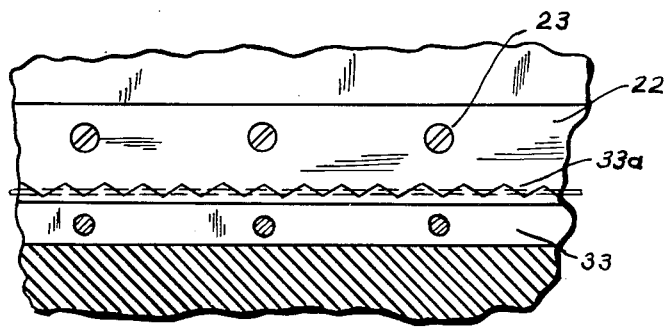

Forming a part of this application are drawings, in which,

Fig. 1 is a fragmentary vertical sectional view through a punch press with the present invention applied, taken on substantially line 1—1 of Fig. 3, Fig. 2 is a fragmentary view, slightly enlarged, taken on line 2—2 of Fig. 1, Fig. 3 is a sectional view, slightly enlarged, taken on line 3—3 of Fig. 1, Fig. 4 is a fragmentary view, slightly enlarged, taken on line 4—4 of Fig. 3, Fig. 5 is a perspective view of a sheet of material showing part of the sheet expanded, Fig. 6 is an enlarged fragmentary elevational view of a part of the sheet with a part expanded, Fig. 7 is a perspective view of the cutter, Fig. 8 is a diagrammatic view illustrating the method of feed and formation.

In the drawings I have shown a punch press bolster 16 on which is mounted a die shoe 17 and secured in position by the screws 18. The ram 19 carries a shoe 21 which is secured thereto by the screws 20. A shearing blade 22 is secured on the shoe 21 by means of the screws 23. Resting on the bed 24 is a back gage 25 having its engaging edge 27 extending diagonally to the length of the blade 22. This bed 24 is secured to the shoe 17 by means of the screws 28 and is normally pressed away from the shoe by means of the spring 29. As the ram comes down, the bed 24 will move downwardly of the shoe until it engages the stop block 30 as shown in Fig. 1. A supporting block 31 is mounted by dowel pins 32 to the shoe 17 and secured to this supporting block 31 by means of the screws 34 is a shearing blade or die 33 having the spaced apart teeth 33a formed in its upper face. The strip of metal or work-piece 26 rests upon the bed 24 with one edge engaging the edge 27 of the back gage 25 so that this strip of metal is fed diagonally of the shearing and forming line which is established by the blade 22 and the die 33.

In feeding the strip of material, I use a conventional type of feeding which is well known in the art.

Mounted on and projected upwardly from the cover plate 35 is a block 36 to which one end of the toggle link 37 is connected, the opposite end of this toggle link 37 being pivotally connected to one end of the toggle link 38 and the opposite end of this toggle link 38 is pivotally connected to a bar 39. Mounted on the plate 35 is a block 40 through which the bar 39 slidably projects. A recess 41 is provided in the block 40. Slidably projecting through a portion of the block 40 and extending into the recess 41 is a bolt 42 on one end of which is a nut 43. This bolt 42 also slidably projects through the slot 44 formed in the feeding finger 45. The upper end of this feeding finger 45 is engaged by an adjusting screw 46. A spring 47 embraces the bolt 42 and bears at one end against the face of the block 40 and at the other end against nuts 48 threaded on the bolt 42, all as clearly shown in Fig. 4. The block 40 is, as shown in Fig. 4, fixedly secured to the plate 35 by means of the screws 49.

Secured to and projecting outwardly from the block 40 is a rod 50 which extends through a cross head 51. Mounted on the rod 50 in embracing relation is a spring 52 one end of which bears against the face of the cross head 51 and the other end of which engages a nut 53 on the rod 50. Threadably projected through the cross head 51 is a stop bolt 54 on which is threaded the lock nut 55. Extended through the cross head 51 is a stud 56 which also extends through a slot 57 formed in the feeding finger 58. A head 59 is mounted on the cross stud at one end and in the opposite end are nuts 60 against which bears one end of the coil spring 61 which embraces the stud 56 and which bears at its opposite end against one face of the cross head 51. The upper end of the feeding finger 58 is engageable by the adjusting screw 62. As clearly shown in Fig. 1, the die shoe 21 is provided with a recess 62 in which the feeding mechanism engages.

The construction is such that as the ram comes down, the toggle is straightened out so that the block 51 will move to the right of Fig. 4 against the compression of the spring 52. In this movement the feeding finger 58 will rock at its lower end to the left so as to slide over the strip of work-piece 26. When the ram goes up the cross head 51 will be moved to the left in response to the pressure of the spring 52 and the feeding finger 58 will force the strip of material 26 to move to the left. The feeding finger 45 serves as a safety factor for preventing movement of the feeding strip 26 to the right when the block 51 is moved to the right. As the strip of material 26 is moved to the left the lower end of the finger 45 will rock so as to permit the strip of material to slide freely beneath it.

In order to retain the strip 26 of material against the edge of the back gage 25, I provide a control bar 63 which engages the work-piece. This control bar is mounted on a plate 64 to which is pivotally attached one end of the link 65. The opposite end of this link is pivoted on the pin 66 which extends through the spacing block 67 which is secured to the shoe 17. A similar spacing block 68 is secured to the shoe 17 and pivoted intermediate its ends and on this spacing block 68 is a link 69 one end of which is pivoted to the plate 64. Connected to the free end of the link 69 is one end of a spring 70 the other end of which is connected to the plate 64 so as to normally retain the link 69 swung into such a position that the control bar 63 will be retained in engagement with the work-piece surface to maintain the work-piece in engagement with the face of the back gage.

The method of formation of the expanded metal may perhaps be better understood from an examination of Fig. 5, Fig. 6 and Fig. 7. As the ram moves downwardly so as to carry the blade or plate 22 downwardly, the bed 24 will be moved downwardly so that the work-piece will pass downwardly of the die 33. A common pattern used in expanded metal is quadrilateral and usually of diamond shape. This pattern may be varied within certain limits without changing the forming teeth 33a. In forming the strand A in Fig. 6, the point B was centered to one of the teeth so that the apex of the tooth engaged the point B and the tooth sheared this strand to form the clear space C. This strand is not sheared at the points D. It will be noted that the previously formed strand E has a point F and at the points F and B the strands D and E are connected together. The point F of the strand E corresponds in formation to the point D of the strand A so that the point H of the strand E is formed by the apex of the tooth. In conventional types of meshes in order to have this staggered operation after each shearing and forming operation either the die 33 must be longitudinally shifted or the work-piece must be longitudinally shifted of the die 33. In other words, there must be a relative displacement of the work-piece and die at each operation and this relative displacement must be longitudinally of the die and transversely of the strip of metal operated upon. From the description it will be obvious that in the present invention, there is no shifting of the die longitudinally and there is no bodily shifting of the work-piece longitudinally of the die. Consequently the mechanism used for affecting such shifting is eliminated and the disadvantages resulting from such mechanism getting out of order is avoided.

In Fig. 8, I have indicated diagrammatically the forming operation. The sheet 26 of metal is fed longitudinally and the die or cutter 33 extends diagonally of the length of the strip 26. Were this die 33 to extend transversely to the strip 26, i. e., at right angles thereto, as the strip 26 was fed past the die 33, each tooth on the die 33 would occupy a set and determined position longitudinally of the position of the strip 26. But since each repeated operation must be shifted relatively to the preceding operation a relative shifting of the die and work-piece would have to be effected.

In the present invention, the strip of material is fed in the direction of the arrow in Fig. 3 and in Fig. 8. The amount of this movement is such that the point F, of the strand E, will be brought directly over the point B of the strand D.

It is to be noted that in this operation a continuous strip of expanded metal is formed by large sidewise expansion and a smaller lengthwise expansion of the original material.

It will also be noted that in the pattern, the expansion is primarily along the transverse axis of the pattern. This transverse axis, indicated by the line T—V, of the pattern extends substantially normal to the line of shear and consequently angularly to the marginal edge M. Consequently the longitudinal axis of the pattern extends substantially parallel to the line of cut or shear. This is substantially the direct opposite of the result which is obtained when the cutters are operated while extending transversely of the sheet of material.

In this way I obtain strands L which extend lengthwise of the piece of material. For certain application, where resistance to lengthwise stretch is desirable, this is a considerable advantage as these strands run with the grain of the metal and not transversely of it.

It will also be noted that in this operation, we are not limited to a formation determined by the width of the sheet of material operated upon but by extending the cutter blades or dies diagonally a much larger amount of expanding may be effected with each operation. This of course results in considerable economy inasmuch as a larger amount of finished product may be produced before it becomes necessary to resharpen the cutters. Since no reciprocating motion is necessary, the material may be fed into the machine from a coil and thus a continuous operation carried on with merely an up and down movement of the forming machinery.

What I claim is:

1. The method of forming expanded metal consisting in feeding, step by step, a sheet of metal to be operated upon longitudinally of the grain of said metal across the path of operation of shearing and forming mechanism diagonally thereof, maintaining the shearing and forming mechanism in fixed longitudinal relation to the line of shearing and forming, and operating said mechanism between each feeding step for forming in the metal a path of plurality of quadrilaterals connected together at their apexes with one of their sides extending parallel to the longitudinal edge of the expanded metal formed.

2. The method of forming expanded metal consisting in feeding a strip of metal longitudinally in a fixed path diagonally across the path of operation of shearing and forming mechanism, maintaining said shearing and forming mechanism in a longitudinally fixed position relative to the line of shearing and forming and operating said shearing and forming mechanism between each feeding step.

3. The method of forming expanded metal consisting in feeding a strip of metal, step by step, longitudinally in a fixed path across the line of operation of shearing and forming mechanism, diagonally thereof, maintaining said strip laterally fixed in said path, operating said shearing and forming mechanism between each feeding step for shearing and forming the metal and maintaining the shearing and forming mechanism in fixed longitudinal relation to said path for producing quadrilaterals having sides paralleling the longitudinal side edge of the expanded metal.

4. The method of forming expanded metal consisting in feeding a strip of metal longitudinally step by step in a fixed path diagonally across a line of operation of shearing and forming mechanism, maintaining said strip in fixed lateral position in said path, operating on said metal at said line in a direction vertical to the plane of said sheet and maintaining the shearing and forming mechanism in fixed longitudinal relation to said strip.

5. The method of forming expanded metal consisting in feeding a strip of metal longitudinally of the grain of the metal step by step, diagonally across the line of operation of shearing and forming mechanism, maintaining said strip in fixed lateral relation to said path, operating upon said metal at said line between each feeding step for shearing and forming a predetermined path and maintaining the shearing and forming mechanism in fixed transverse relation to said strip.

6. The method of forming expanded metal consisting in establishing a fixed path of travel for a strip of metal and establishing a line of shearing and forming diagonally across said path, feeding a strip of metal longitudinally in said path across said line of shearing and forming in a step by step movement maintaining said strip in lateral fixed relation to said path, operating shearing and forming mechanism at said line of shearing and forming between each step of feeding in a direction at right angles to the plane of said path for shearing and forming said metal at said line of shearing and forming; and maintaining the shearing and forming mechanism in fixed longitudinal relation to said line of shearing and forming.

References Cited in the file of this patent

UNITED STATES PATENTS

| Number | Name | Date |
|---|---|---|
| 381,230 | Golding et al. | Apr. 17, 1888 |
| 385,663 | Ekstrom | July 3, 1888 |
| 619,340 | Pitkin | Feb. 14, 1899 |
| 796,402 | Curtis | Aug. 1, 1905 |
| 843,728 | White | Feb. 12, 1907 |
| 1,292,570 | Curtis | Jan. 28, 1919 |
| 1,537,588 | Curtis | May 12, 1925 |
| 1,837,393 | Arey | Dec. 22, 1931 |
| 1,948,081 | Silver | Feb. 20, 1934 |